United States Patent
Somaiya

(10) Patent No.: US 9,665,298 B2
(45) Date of Patent: May 30, 2017

(54) METHOD AND SYSTEM TO REDUCE POWER USAGE ON AN I/O INTERFACE

(71) Applicant: SanDisk Technologies Inc., Plano, TX (US)

(72) Inventor: Vikram Somaiya, Bangalore (IN)

(73) Assignee: SanDisk Technologies LLC, Plano, TX (US)

( * ) Notice: Subject to any disclaimer, the term of this patent is extended or adjusted under 35 U.S.C. 154(b) by 126 days.

(21) Appl. No.: 14/692,447

(22) Filed: Apr. 21, 2015

(65) Prior Publication Data

US 2016/0313940 A1 Oct. 27, 2016

(51) Int. Cl.
- *G06F 3/06* (2006.01)
- *G06F 1/32* (2006.01)
- *G06F 13/40* (2006.01)
- *G06F 1/26* (2006.01)

(52) U.S. Cl.
CPC .......... *G06F 3/0625* (2013.01); *G06F 1/3268* (2013.01); *G06F 1/3275* (2013.01); *G06F 3/0685* (2013.01); *G06F 13/4072* (2013.01); *G06F 1/26* (2013.01)

(58) Field of Classification Search
CPC .... G06F 3/0625; G06F 3/0685; G06F 1/3268; G06F 1/3275
See application file for complete search history.

(56) References Cited

U.S. PATENT DOCUMENTS

| | | | | |
|---|---|---|---|---|
| 7,907,002 B2* | 3/2011 | Bracmard | ........ | G01R 31/31703 323/313 |
| 8,278,952 B2* | 10/2012 | Tseng | ................. | G01R 31/3172 324/750.3 |
| 2003/0051086 A1* | 3/2003 | Smith | ..................... | G06F 11/24 710/106 |
| 2005/0278463 A1* | 12/2005 | Ando | .................. | G06F 13/4217 710/8 |
| 2011/0141827 A1 | 6/2011 | Mozak et al. | | |
| 2011/0211626 A1* | 9/2011 | Yen | ........................ | H04B 17/26 375/224 |
| 2011/0286288 A1 | 11/2011 | Mutnury et al. | | |
| 2011/0289388 A1 | 11/2011 | Nelson et al. | | |

OTHER PUBLICATIONS

International Search Report corresponding to International Application No. PCT/US2016/026376 dated Jul. 1, 2016; 3 pages.
Written Opinion of the International Searching Authority corresponding to International Application No. PCT/US2016/026376 dated Jul. 1, 2016; 5 pages.

* cited by examiner

*Primary Examiner* — Stefan Stoynov
(74) *Attorney, Agent, or Firm* — Brinks Gilson & Lione

(57) ABSTRACT

Methods and apparatuses for applying different voltages to an I/O interface (such as to the pads of the I/O interface) and determining the data integrity of communicating data (either transmitting to or receiving data from) to another device is disclosed. Data integrity may be measured in one of several ways, such as the window (or timing) at which data can be transmitted correctly using the different voltages. The determined data integrity may be compared with a minimum data integrity, such as a minimum window. In the event that the determined data integrity is greater or better than the minimum data integrity, then the voltage may be reduced and the data integrity determination may be performed again. In this way, the voltage applied to the I/O interface may be reduced while still meeting the minimum data integrity requirements.

19 Claims, 10 Drawing Sheets

US 9,665,298 B2

METHOD AND SYSTEM TO REDUCE POWER USAGE ON AN I/O INTERFACE

TECHNICAL FIELD

This application relates generally to memory devices. More specifically, this application relates to reducing power usage on an I/O interface.

BACKGROUND

Non-volatile storage devices, such as flash memory, have been widely adopted for use in consumer products. Flash memory may be found in different forms, for example in the form of a portable memory card that can be carried between host devices or as a solid state disk (SSD) embedded in a host device.

Consumer products store and retrieve increasing amounts of data from flash memory. Examples of data intensive operation includes storing a photograph or video to a flash memory or retrieving music files stored in the flash memory. In storing data to or reading data from the flash memory, an I/O interface is used.

OVERVIEW

In one aspect, an I/O interface configuration device is disclosed. The I/O interface configuration device includes: a voltage component configured to output a voltage to at least a part of an I/O interface; an iterative component configured to iterate at a plurality of different voltages by: commanding the voltage component to output each of the plurality of different voltages to the at least a part of the I/O interface; determining under which one or more conditions data is correctly transferred via the I/O interface using each of the plurality of different voltages; an I/O interface selection component configured to select, based on the one or more conditions under which the data is correctly transferred, the voltage applied to the at least a part of the I/O interface.

In another aspect, an I/O interface configuration device is disclosed. The I/O interface configuration device includes: a voltage selection component configured to select a voltage applied to at least a part of an I/O interface; a data integrity component configured to determine data integrity of data transferred via the I/O interface using the selected voltage; an evaluation component configured to evaluate, based on the determined data integrity of data transferred via the I/O interface using the selected voltage, whether to operate the I/O interface at the selected voltage; and an I/O interface selection component configured to select, based on the evaluation component, the voltage applied to the at least a part of the I/O interface.

In still another aspect, a method for determining a voltage at which to operate a part of an I/O interface is disclosed. The method includes: selecting a voltage at which to operate the part of I/O interface; determining under which one or more conditions data is correctly transferred via the I/O interface using the selected voltage; and determining, based on the one or more conditions that data is correctly transferred via the I/O interface using the selected voltage, whether to use the voltage to operate the part of the I/O interface.

Other features and advantages will become apparent upon review of the following drawings, detailed description and claims. Additionally, other embodiments are disclosed, and each of the embodiments can be used alone or together in combination. The embodiments will now be described with reference to the attached drawings.

DETAILED DESCRIPTION

Figure 1:
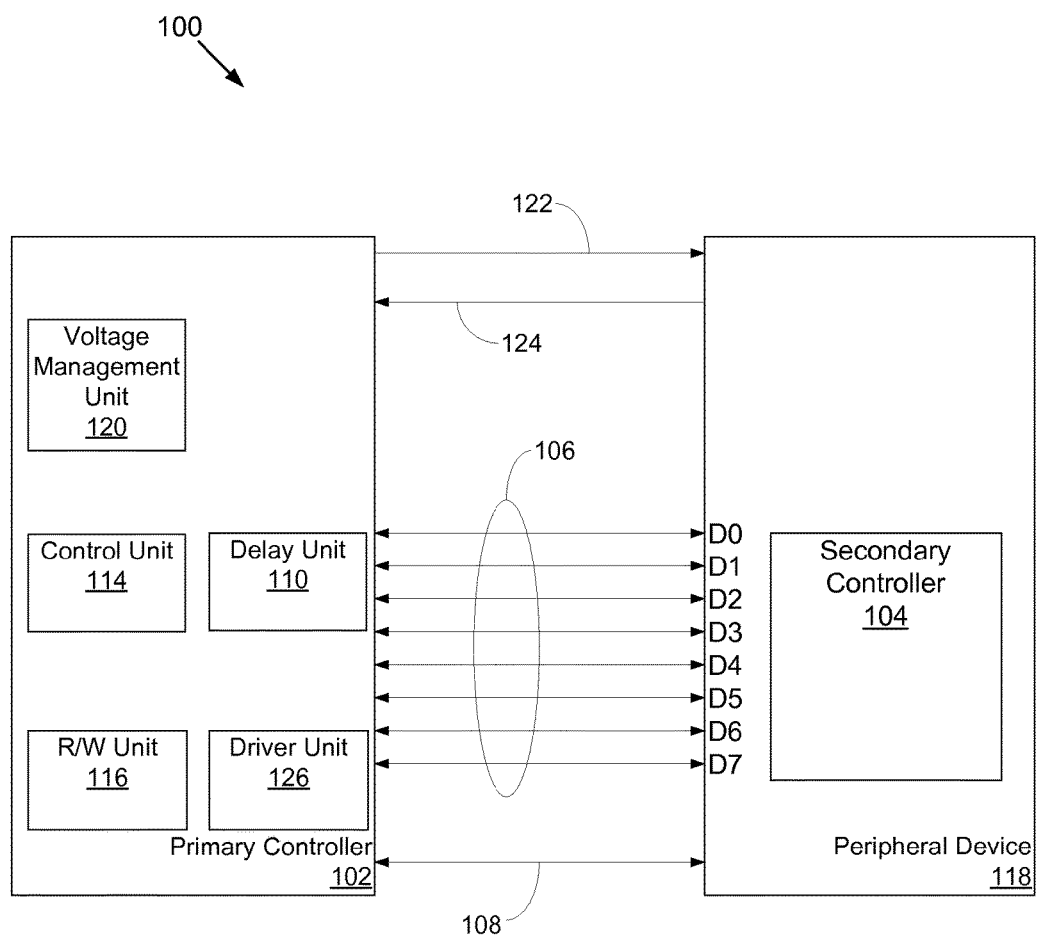
FIG. 1 is a block diagram of an exemplary system comprising a primary controller and secondary controller that may exchange information using the several operating modes disclosed herein.

An I/O interface enables an electronic device to communicate with another electronic device. For example, data may be output from the electronic device to the other electronic device and/or data may be input to the electronic device from the other electronic device. The I/O interface may be in one of several forms, such as in the form of an ASIC.

In order to operate properly, the I/O interface is configured to meet predetermined timing requirements. Various factors, such as process, voltage and temperature, affect the timing of the I/O interface. For example, the timing of the I/O interface at the same temperatures may vary across different process corners (e.g., fast-fast, typical-typical, slow-slow). More specifically, a fast-fast process corner results in a faster I/O interface whereas a slow-slow process corner results in a slower I/O interface. In order to meet the timing requirements across different process corners, the voltage selected to operate the I/O interface is selected assuming a slow-slow process corner. Thus, by selecting the voltage assuming a worst-case scenario, the I/O interface timing requirements may be met regardless of the process corner. However, this selection of the voltage assuming the worst-case scenario may result in power being unnecessarily wasted. For example, in the event that the process corner for the I/O interface is better than expected (e.g., fast-fast), the voltage applied to the I/O interface is greater than necessary to meet the predetermined timing requirements.

In one embodiment, the voltage is selected based on analyzing whether, at the voltage selected, the data meets one or more predetermined data integrity criteria. This is unlike pre-selecting the voltage assuming the worst-case scenario, and not testing whether the pre-selected voltage enables data to be transferred with data integrity. Rather, the voltage is selected, and dynamic analysis is performed to determine whether, at the voltage selected, the data meets the one or more predetermined criteria.

For example, a voltage may be selected for application to a part of the I/O interface, such as to the pads of the I/O interface. Data is transmitted via the I/O interface (such as transmitting the data to or receiving from another device) with the selected voltage applied to the part of the I/O interface (e.g., the selected voltage applied to the pads of the I/O interface). The data transmitted is analyzed for data integrity. Based on the data integrity, it is determined whether to operate the I/O interface using the selected voltage. For example, as discussed in more detail below, the process may iterate using different voltage(s) and determining the data integrity using the different voltage(s).

As discussed in more detail below, there are a variety of data integrity criteria. One such data integrity criteria relates to the timing of the data through the I/O interface, such as the timing when transferring data from a first electronic device through the I/O interface to a second electronic device and/or the timing when transferring data from the second electronic device through the I/O interface to the first electronic device. For example, with an I/O interface transferring data to/from a memory, the timing may relate to transferring data for a write to the memory and/or relate to transferring data for a read from the memory.

As discussed in more detail below, timing may be represented in one of several ways. In one way, the timing may be represented as a window (or eye) during which data may be reliably transferred, discussed below. In another way, the timing may be represented by the settings of the extreme values of the delay locked loop (DLL) settings where the data transfer integrity is lost, discussed further below. In this regard, the window or eye at which the I/O interface data may be reliably or correctly transferred is one example of the condition(s) under which data is correctly transmitted via the I/O interface. Other condition(s) at which data is correctly transferred via the I/O interface using one or more voltages are contemplated.

In a more specific embodiment, the system may iterate multiple times by selecting a voltage and determining, at the selected voltage, whether the data transferred has the predetermined data integrity criteria. In one embodiment, the initial voltage selected may be predetermined. For example, the initial voltage may be selected assuming the worst-case scenario (e.g., a slow-slow process corner). In an alternate embodiment, the initial voltage may be dynamically selected. Further, in one embodiment, the predetermined data integrity criteria may comprise the minimum criteria at which data may be transferred with integrity (e.g., the minimum window or the minimum DLL range).

Further, whether to iterate again may be determined in one of several ways. In one way, a voltage (such as the voltage assuming the worst-case scenario) may be selected, and the data integrity criteria (such as the window or eye, or the DLL settings) may be determined. The data integrity criteria may be compared with the predetermined data integrity criteria. The comparison may determine whether to iterate. In the example of the predetermined data integrity criteria comprising a minimum DLL range, in response to determining that the DLL range at the selected voltage is greater than the minimum DLL range, the process may be iterated at a lower voltage. When the DLL range at the selected voltage is less than the minimum DLL range, iteration may stop and a voltage may be selected so that the associated DLL range at the selected voltage is close to, but not less than the minimum DLL range. In this way, the voltage to the I/O interface may be reduced (so that the power expended is likewise reduced) while still meeting the predetermined data integrity criteria (such as meeting the minimum DLL range) when transferring data. For example, the power consumed on the I/O interface is dependent on the capacitive load, frequency and voltage level. The dynamic power may be represented as $0.5\ CV^2$. Reducing the voltage to the I/O interface by, for example, 2% saves power by a square of the reduced voltage.

Referring to the figures, FIG. 1 illustrates a system with an I/O interface. The system depicted in FIG. 1 is merely one example of an I/O interface. Other examples of I/O interfaces are contemplated. More specifically, system 100 depicts an exemplary system that may implement methods for adjusting the voltage to the I/O interface in which data signals are communicated between primary controller 102 and secondary controller 104 via data bus (DQ) 106 and data strobe (DQS) line 108. In one embodiment, the data bus 106 and the DQS line 108 may be collectively referred to as the I/O interface. In an exemplary embodiment, primary controller 102 may be implemented as an application specific integrated circuit (ASIC). In an exemplary embodiment, secondary controller 104 may be included in a peripheral device 118 and may control the operation of the peripheral device 118. By way of example and without limitation, data communication via a parallel byte-wide data bus is described. Other bus widths are contemplated.

In an exemplary embodiment, primary controller 102 includes a control unit 114, read-write (R/W) unit 116, delay unit 110, a driver unit 126, and a voltage management unit 120. In an exemplary embodiment, R/W unit 116 operates to instruct secondary controller 104 to perform device specific actions on peripheral device 118.

In an exemplary embodiment, voltage management unit 120 may comprise a voltage regulator that is configured to receive an input signal, and in response to receiving the input signal, generate a regulated voltage as an output. As discussed in more detail below, the voltage to the I/O interface may be changed. In this regard, the voltage regulator may modify its output regulated voltage in response to a command (such as from control unit 114). In an exemplary embodiment, componentry in the delay unit 110 may be connected with the DQS line 108. Thus adjustments made to the settings of the driver unit 126 may cause changes in the characteristics of the lines of data bus (DQ) 106. Adjustments made to the settings of the delay unit 110 may delay the transmission of a DQ signal on the DQS line 108. In an exemplary embodiment, control unit 114 operates to configure the settings of the driver unit 126, delay unit 126 and voltage management unit 120.

For example, primary controller 102 may operate the delay unit 110 to delay the DS signal transmitted via the DQS line 108 relative to the data signals communicated via the data bus 106. In an exemplary embodiment, delay unit 110 may include several delay elements. Settings of the driver unit 126 may likewise be selected. In one embodiment, the settings of the driver unit 126 are predetermined and static. In an alternate embodiment, the settings of the driver unit 126 are dynamic and may be adjusted to change the drive current sourced by the respective data line connected to the driver unit 126. As will be explained in detail below, settings of the voltage management unit 120 and delay unit 110 may be dynamically optimized to control the relative timings of the data signals communicated between primary controller 102 and secondary controller 104 via data bus (DQ) 106 and data strobe (DQS) line 108.

In an embodiment, primary controller 102 and secondary controller 104 exchange data and commands via data bus 106. Exchange of data, address and commands may be accomplished using one of two modes of operation—legacy mode or toggle mode.

In a legacy mode of operation, address, data and command exchange is accomplished by activating one of the write enable line (WEn) 122 or read enable line (REn) 124. WEn 122 and REn 124 may be referred to as legacy mode control lines. To write data to secondary controller 104 in legacy mode, primary controller 102 writes the data to DQ 106 and activates the WEn line 122. To read information from secondary controller 104, in legacy mode, a read command may be written to secondary controller 104 and the data may be read back via DQ 106 by activating REn line 124. Of note, in legacy mode of operation, data and commands are written to and read from secondary controller on the rising edge or the falling edge of signals communicated on the legacy mode control lines, write enable line (WEn) 122 or read enable line (REn) 124, respectively.

Figure 4A:
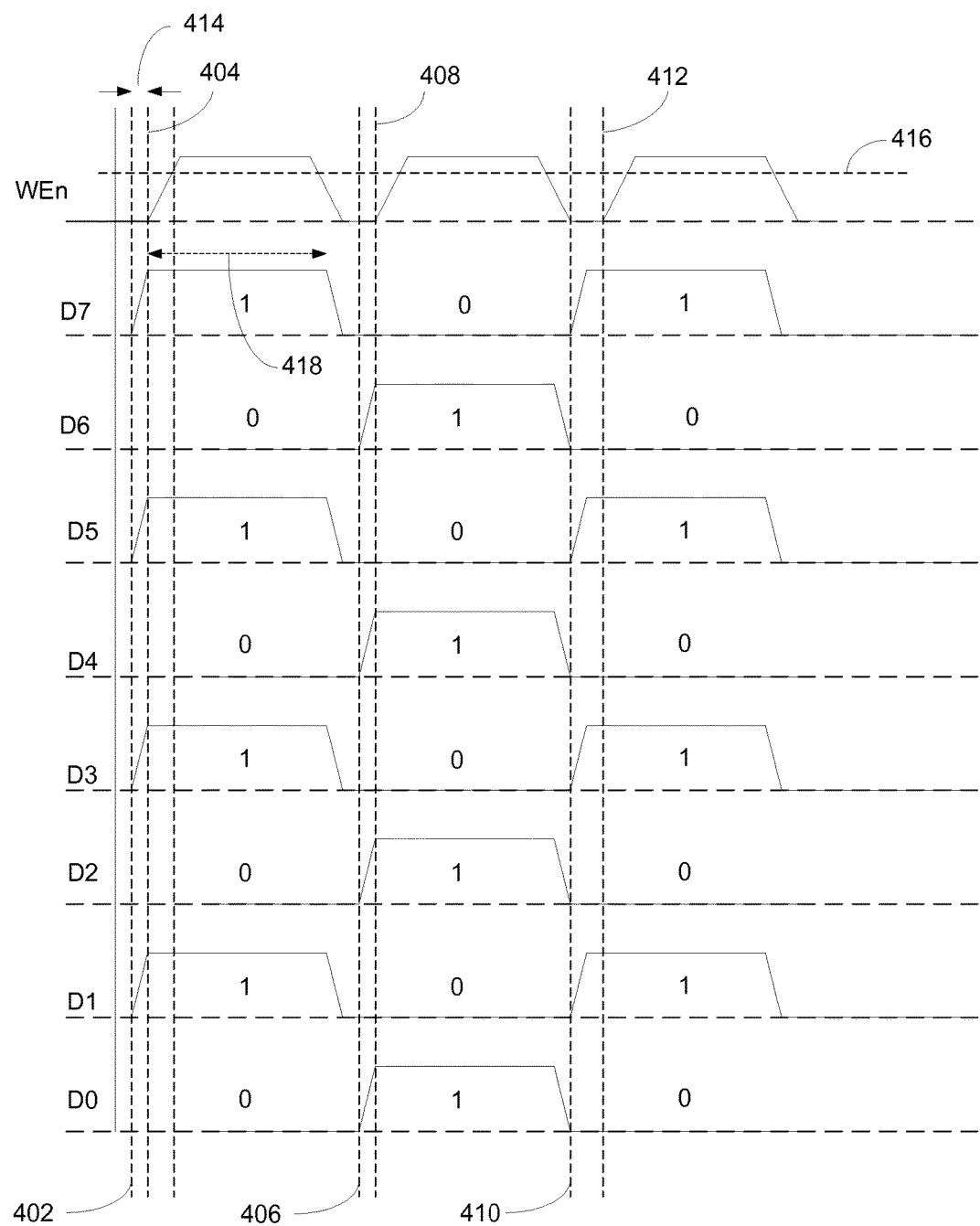
FIG. 4A is a timing diagram of a legacy mode of operating an interface between an exemplary primary controller and secondary controller.

By way of example, timing diagram 400 of FIG. 4A illustrates one example of timing of the data signals on DQ lines 106 and WEn 122 when performing write operations in the legacy mode of operation, in accordance with one embodiment. The horizontal axis corresponds to time and the vertical axis corresponds to signal level or voltage level. In this example, data bytes 0xAA (b10101010), 0x55 (b01010101) and 0xAA (b10101010) are sequentially written to data lines D0-D7. At time 402, primary controller 102 writes data byte 0xAA to data bus 106. Data lines that are asserted high i.e. D1, D3, D5 and D7 do not instantaneously transition to the active high state. Instead the transition occurs gradually, as indicated by the slope of the transitions. Importantly, the voltage transitions on the different data lines may have different slopes, in part because of differing electrical and transmission characteristics of the different data lines. The rate of change of the voltage or slope of the voltage transition may be referred to as the slew rate of the line.

At time 404, primary controller 102 may drive a signal on the WEn line 122. Memory controller 102 delays driving the signal on the WEn line 122, by a delay period 414, to ensure, in part, that the voltage levels on the data lines are stable and that the data lines are in the logic state corresponding to the data being written. In an embodiment, when the signal level on the WEn line 122 exceeds a voltage threshold 416, secondary controller 104 may latch the state of the data lines and read the latched data. Time period 414 corresponds to the time it takes for the data lines D0-D7 to reach their respective steady state levels. In an exemplary embodiment, WEn line 122 may be activated at a time 404 corresponding to the time when the signal levels on the data lines D0-D7 have reached their steady state levels corresponding to the data written i.e. 0XAA. Period 418 corresponds to the time that the signal levels of data lines D0-D7 are maintained in their steady state. Accordingly, asserting WEn line 122 during this period will result in the correct data i.e. 0XAA being latched. The difference between time 402 and 404, time 406 and 408, and time 410 and 412 each correspond to the time required for the data lines D0-D7 to reach their steady state levels corresponding to the written data by primary controller 102, for example.

In the toggle mode of operation, primary controller 102 activates the DQS line 108 in conjunction with the data lines 106 to perform data read and write operations from and to secondary controller 104. The data read may be the result of the primary controller 102 instructing secondary controller 104 to perform a function specific to the peripheral device 118. DQS line 108 may be referred to as a toggle mode control line. Address and command information may be written to peripheral controller 118 using the legacy mode of writing by activating the WEn line 122. Importantly, in the toggle mode of operation, data is read or written by primary controller 102 during both the rising and falling edge of the signal driven on DQS line 108. The toggle mode may also be referred to as a dual data rate mode because the throughput of an interface for exchanging data is twice that for the legacy mode. In an embodiment, data exchange via data bus 106 may be controlled by activating the DQS line 108 at the appropriate time. Activating the DQS 108 is achieved by driving an electrical signal on the DQS line 108. The signal driven on the DQS line 108 may be referred to as the data strobe (DS) signal.

In the toggle mode of operation of DQS line 108, primary controller 102 may write a data byte to data lines D0-D7 and drive an active high signal on DQS line 108. In response to detecting a voltage on the DQS line 108 that exceeds a threshold voltage, peripheral controller 118 may latch the data lines D0-D7 and read the data byte. Subsequently, primary controller may write the next data byte to data lines D0-D7 and drive an active low signal on DS 108. In response to detecting a voltage on the DQS line that is below a threshold voltage, secondary controller 104 may latch the data lines D0-D7 and read the next data byte. Thus, in the toggle mode of operation data is communicated between the primary and secondary controller during both the rising and falling edge of DS 108.

Timing diagram 450 of FIG. 2B illustrates the timing of the data signals on DQ lines 106 and DQS 108 when performing write operation in the toggle mode of operation, in accordance with one embodiment. By way of example only, this timing diagram only depicts the signal levels of only three of the data lines, D0, D1 and D2 for example and the DQS line 108. Other timing diagrams are contemplated.

Figure 4B:
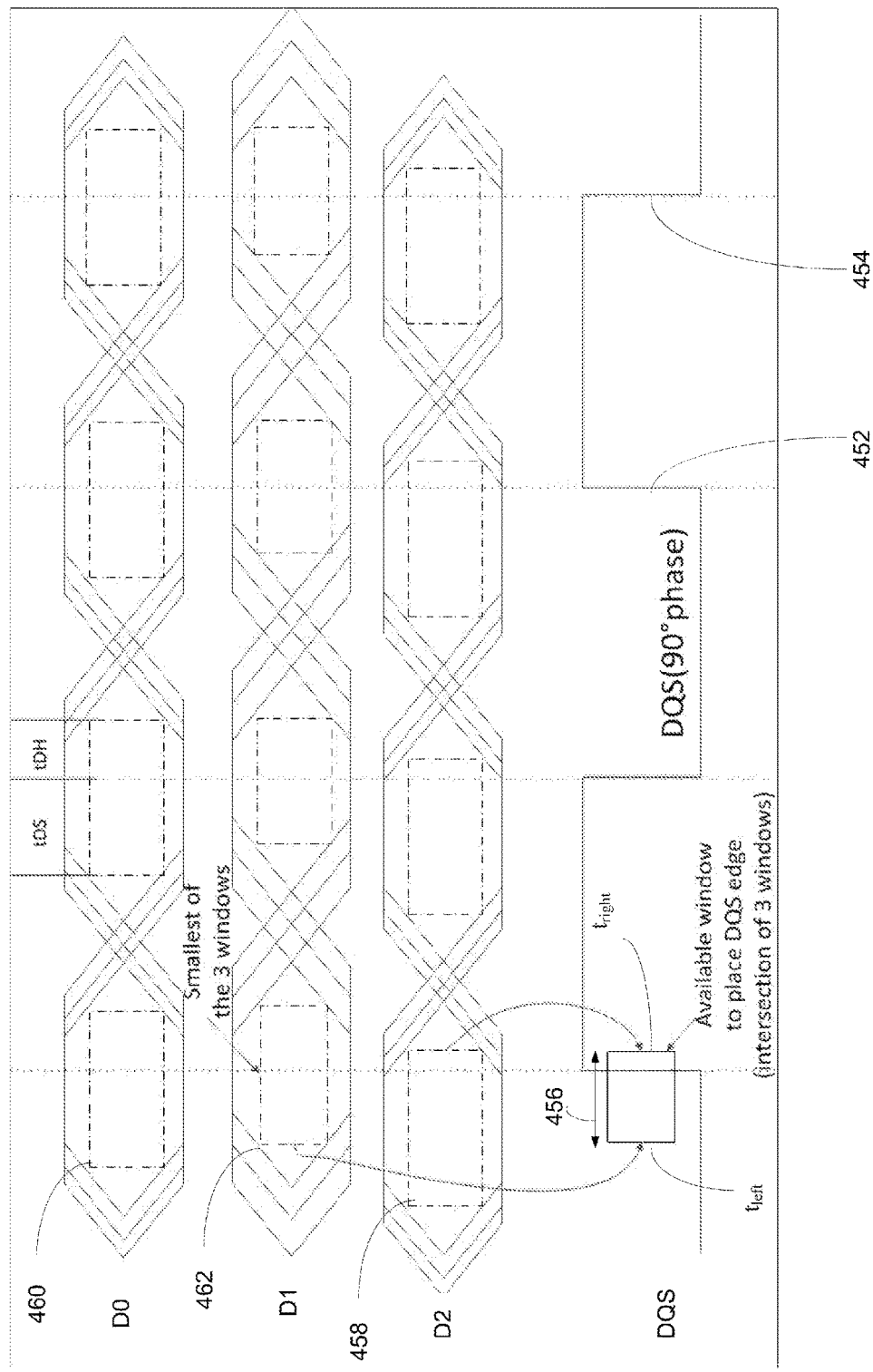
FIG. 4B is a timing diagram of a toggle mode of operating an interface between an exemplary primary controller and secondary controller.

For example, to communicate data to peripheral controller 118, primary controller 102 may write data at data lines D0-D2 and drive a DS signal on the DQS line 108. In response to detecting that the DS signal on DQS line 108 has transitioned to an active state, logic high for example, peripheral controller 118 may latch the state of the data lines in response to detecting the active state or the rising edge on the DQS line 108. The active state typically corresponds to a threshold voltage level. As previously explained in toggle mode, data is latched, read or written, on both the rising edge 452 and the falling edge 454 of the signal on DQS 108. In order for the correct data to be read or written, the activation of the DS signal must be delayed until the data on the data lines are stable. If the primary controller 102 activates the DS on the DQS line 108 prematurely, peripheral controller 118 may latch the data on data lines before the correct data appears on the data lines 106. As previously explained, the signals on the respective data lines may settle at their respective desired values at different rates. It is particularly desirable to activate the DQS line 108 nearly simultaneously when data is written to the data lines 106. As is evident from FIG. 4B, the signal level of data line D2 stabilizes first at time 458, next the signal level of data line D0 stabilizes at time 460 and lastly the signal level of the data line D1 stabilizes at time 462.

The time 462 represents the earliest time that DQ signal on DQS line 108 may be transitioned after the data is written to the data lines to ensure that the correct data is read or written. The time of activation of the left edge of DQ signal on DQS line 108 may be represented by value $t_{left}$. Similarly, it is desirable to determine how late $t_{right}$ after the data is written to data lines 106, DS signal on DQS line 108 may be transitioned to cause the correct data to be latched. Based on the determined $t_{left}$ and $t_{right}$ values, primary controller 102 may delay activation of the DS signal on DQS line 108 by a time value that is anywhere between the determined $t_{left}$ and $t_{right}$ values. The difference between time value $t_{left}$ and $t_{right}$ 456 may be referred to as the window or eye 456. Generally activating the DS signal on the DQS line 108 at any time during the window 456 will result in the correct data being latched. As discussed below, the window or eye may be one of the predetermined integrity criteria that is analyzed at different voltages applied to the I/O interface.

In an exemplary embodiment, primary controller 106 may dynamically adjust the setting of the delay unit 110 and the driver unit 126 to determine settings that result in the maximum value for window 456 when writing data to secondary controller 104. As discussed in more detail below, the process of adjusting the setting to maximize the value of window 456 may be used in determining a window 456 associated with a selected voltage applied to the I/O interface.

Figure 2:
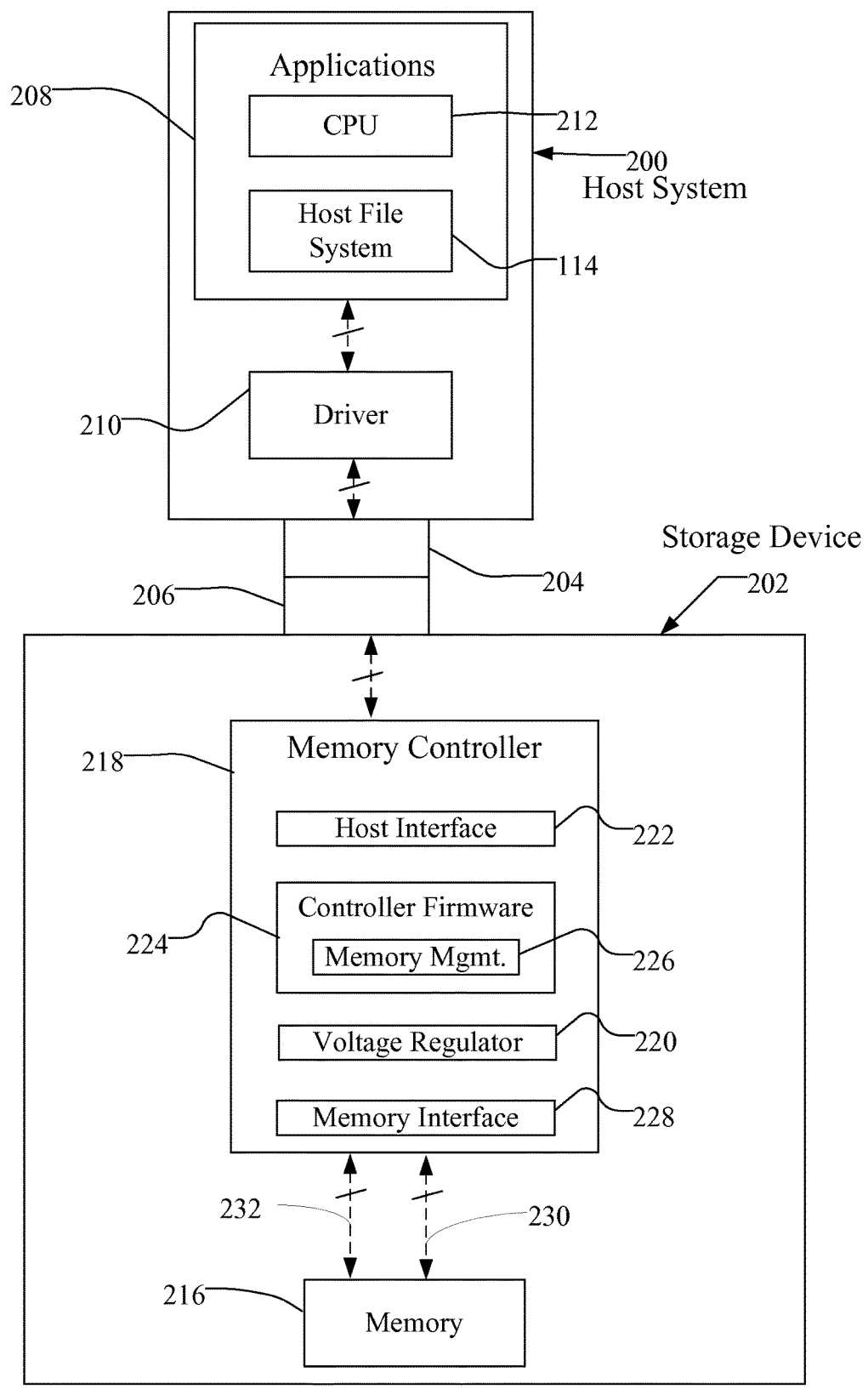
FIG. 2 is an exemplary block diagram of a system that may implement the system and methods described herein.

As discussed above, an I/O interface may be used in a variety of electronic devices. One example of an electronic device comprises a storage device. In this regard, a system suitable for implementing methods and apparatus as applied to a storage device is depicted in FIG. 2. A host system 200 of FIG. 2 stores data into and retrieves data from a storage device 202. The storage device 202 may be embedded within the host, such as in the form of a solid state disk (SSD) drive installed in a personal computer. Alternatively, the storage device 202 may be in the form of a flash memory card that is removably connected to the host through mating parts 504 and 506 of a mechanical and electrical connector as illustrated in FIG. 2. A storage device 202 configured for use as an internal or embedded SSD drive may look similar to the schematic of FIG. 2, with one difference being the location of the storage device internal to the host. SSD drives may be in the form of discrete modules that are drop-in replacements for rotating magnetic disk drives. As described, flash memory may refer to the use of a negated AND (NAND) cell that stores an electronic charge.

Examples of commercially available removable flash memory cards include the CompactFlash (CF), the MultiMediaCard (MMC), Secure Digital (SD), miniSD, Memory Stick, SmartMedia, TransFlash, and microSD cards. Although each of these cards may have a unique mechanical and/or electrical interface according to its standardized specifications, the flash storage device included in each may be similar. These cards are all available from SanDisk Corporation. SanDisk also provides a line of flash drives under its Cruzer trademark, which are hand held storage devices in small packages that have a Universal Serial Bus (USB) plug for connecting with a host by plugging into the host's USB receptacle. Each of these memory cards and flash drives includes controllers that interface with the host and control operation of the flash memory within them.

Host systems that may use SSDs, memory cards and flash drives are many and varied. They include personal computers (PCs), such as desktop or laptop and other portable computers, tablet computers, cellular telephones, smartphones, personal digital assistants (PDAs), digital still cameras, digital movie cameras, and portable media players. For portable memory card applications, a host may include a built-in receptacle for one or more types of memory cards or flash drives, or a host may require adapters into which a memory card is plugged. The storage device may include its own primary controller and drivers but there may also be some memory-only systems that are instead controlled by software executed by the host to which the memory is connected. In some storage devices containing the controller, especially those embedded within a host, the memory, controller and drivers are often formed on a single integrated circuit chip. The host may communicate with the memory card using any communication protocol such as but not limited to Secure Digital (SD) protocol, Memory Stick (MS) protocol and Universal Serial Bus (USB) protocol.

The host system 200 of FIG. 2 may be viewed as having two major parts, insofar as the storage device 202 is concerned, made up of a combination of circuitry and software. An applications portion 208 may interface with the storage device 202 through a file system module 214 and driver 210. In a PC, for example, the applications portion 208 may include a processor 212 for running word processing, graphics, control or other popular application software. In a camera, cellular telephone that is primarily dedicated to performing a single set of functions, the applications portion 208 may be implemented in hardware for running the software that operates the camera to take and store pictures, the cellular telephone to make and receive calls, and the like.

The storage device 202 of FIG. 2 may include non-volatile memory, such as memory 216 (e.g., flash memory), and a memory controller 218 that both interfaces with the host system 200 via host interface 222 to which the storage device 202 is connected for passing data back and forth and controls the memory 216. The memory controller 218 may be implemented on a single integrated circuit chip, such as an application specific integrated circuit (ASIC). The memory controller 218 may include a multi-thread processor capable of communicating via a memory interface (MI) 228 having I/O ports for each memory bank in the memory 216. In this regard, FIG. 2 illustrates another example of an I/O interface. Memory controller 218 may communicate with a controller (not shown) of memory 216 via a data bus 230 and a control bus 232. The data bus 230 is another example of a data bus, such as data bus 106 of FIG. 1. Likewise, control bus 232 may comprise various control lines, such as DQS line 108. In an exemplary embodiment, memory controller 218 may implement methods that control the impedance of the data bus 230 and that control the relative timing between signals communicated via the control bus 232 and the data bus 230.

Memory controller 218 further includes voltage regulator 220. Voltage regulator 220 may output one or more regulated voltages for use by memory controller 218. For example, voltage regulator 218 may output a regulated voltage for use by memory interface 228. As discussed in more detail below, the voltage applied to memory interface 228 may be adjusted. In this regard, controller firmware 224 may execute instructions to control voltage regulator 220 to modify the voltage output by voltage regulator 220 in order to adjust the voltage applied to memory interface 228.

Figure 3:
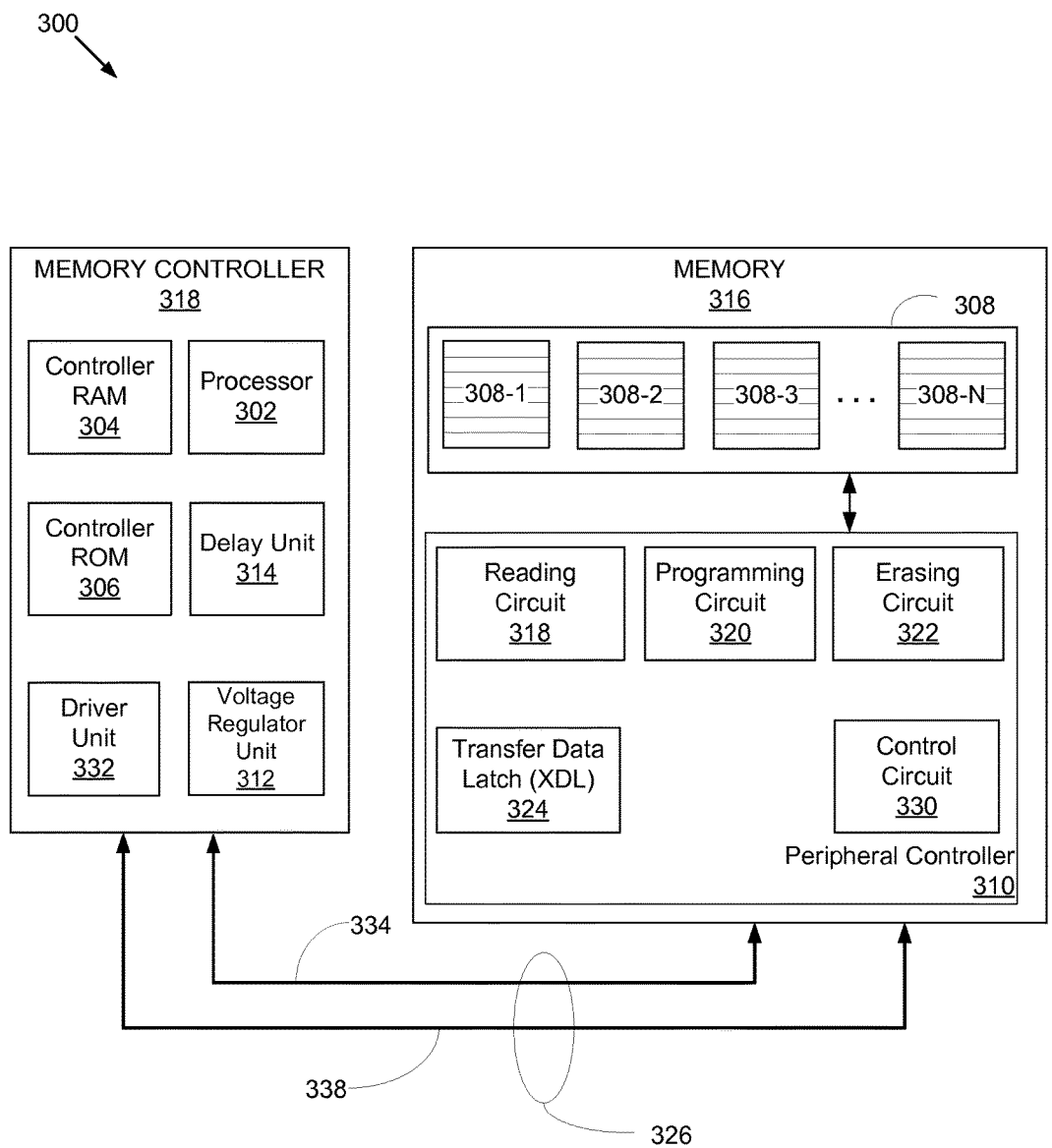
FIG. 3 is block diagram of an example storage device that implements methods to improve the rate at which data can be stored in the storage device.

FIG. 3 is a block diagram of an exemplary storage device 300. In an embodiment, storage device 300 may correspond to the storage device 202 of FIG. 2. In this embodiment, the storage device 300 comprises a memory controller 318 and memory 316. The memory controller 318 and the memory 316 may be coupled by an interface 326 comprising a data bus 334 and control lines 338. Memory controller 318 may utilize toggle mode to read data from and write data to memory 316 via interface 326. The data bus 334 may correspond to data bus 106 of FIG. 1, in an embodiment. In another embodiment, control lines 338 may correspond to the WEn line 122, REn line 124 and DQS line 108 of FIG.

1. In an embodiment, WEn line 122 and REn line 124 are activated to effectuate data and command transfers via data bus 334 between memory controller 318 and memory 316 in legacy mode. In this embodiment, DQS line 108 is activated to effectuate data transfers via data bus 334 between memory controller 318 and memory 316 in toggle mode. In an embodiment, commands generated by the memory controller 318 may be communicated to the memory 316 via data bus 334. Commands may include commands to write data to memory 316, read data from memory 316 or commands to control the operation of the interface 326. In an exemplary embodiment, a command may include a command to switch between legacy and toggle mode of operation. In this embodiment, a set of commands may also include commands that may be used to perform toggle mode receive path and transmit path tuning of the interface 326.

By way of example and without limitation, in an embodiment, memory controller 318 includes a processor 302, controller RAM 304, controller ROM 306 and delay unit 314, driver unit 332, and voltage regulator unit 312. Voltage regulator unit 312 may be configured to receive an input from processor 302 and may be configured to output one or more regulated voltages. The input from processor 302 may be indicative to voltage regulator unit 312 to generate a regulated output at a predetermined voltage level. As discussed in more detail below, the voltages applied to the I/O interface, such as to interface 326, may be adjusted. In order to adjust the voltages applied to interface 326, the processor 302 may send an input to voltage regulator unit 312, the input indicating to voltage regulator unit 312 to output a voltage at a predetermined voltage level (e.g., at 1.08 V). The processor 302 may comprise a microprocessor, a microcontroller, an application specific integrated circuit (ASIC), a field programmable gate array, a logical digital circuit, or other now known or later developed logical processing capability. Memory controller 318 may correspond to primary controller 102 of FIG. 1, in an embodiment.

Controller ROM 306 may store software instructions that processor 302 may execute to control the operation of storage device 300. In an embodiment, controller ROM 306 may also store software instructions corresponding to perform read and write tuning of the interface between memory controller 318 and memory 316. In an embodiment, controller ROM 306 may also include instructions that when executed by processor 302 perform the functionality logically ascribed to host interface 222, controller firmware 224 and memory interface 228.

In an exemplary embodiment, memory 318 includes non-volatile memory 308 and peripheral controller 310. In one embodiment, non-volatile memory 308 comprises NAND flash memory. In this embodiment, non-volatile memory 308 is organized as N memory blocks 308-1 to 208-N. A memory block is organized as a set of memory pages or simply pages. A page is a smallest unit of writing in the memory 308 and a memory block is the smallest unit of erasing. Thus, data is typically programmed or stored on a page by page basis. However, erasing data programmed in a page requires erasure of all the pages in the memory block. Data received from the host system 200 is typically programmed or stored in an erased memory page.

Each page consists of a set of single-level cell (SLC) or multi-level cell (MLC). A SLC memory can store a single bit of data per cell. MLC memory can store multiple bits of data per cell. For example, two-level MLC memory can store 2 bits of data per cell, three level MLC memory can store 3 bits of data per cell and N level MLC memory can store N bits of data per cell. Typical sizes of memory pages are 16 Kilobytes (Kbytes). A memory block, 308-1 for example, typically consists of hundreds of memory pages. In describing exemplary embodiments herein, the term "cell" is used to refer to both SLC and MLC. A memory cell can be in an erased state or a programmed state. A memory page with memory cells in an erased state may be referred to as an erased memory page.

In an embodiment, peripheral controller 310 includes programming circuit 320, reading circuit 318, erasing circuit 322, control circuit 330, and transfer data latch (XDL) 324. The XDL 324 functions as intermediate data storage between memory controller 318 and memory 316.

In an embodiment, the reading circuit 318 of FIG. 3 translates the amount of charge stored in a memory cell to a binary representation of the data corresponding to the amount of charge stored in the cell. By way of example and without limitation, the reading circuit 318 may include current to voltage convertors, amplifiers and analog to digital convertors.

The programming circuit 320 of FIG. 3 translates the binary representation of data received from host system 200 into programming voltages and periods. The programming circuit applies these programming voltages for the periods programming periods to memory cells to cause the memory cells to store electric charge. The amount of stored electric charge is representative of the binary representation of the received data.

Writing the data to XDL 324 may be performed via data bus 334. Separately, memory controller 318 may control the writing of the data by activating control lines 338. Data may be written via data bus 334 in toggle mode as described above. Reading data may also be performed via the data bus 334 by activating control lines 334, DQS line 108 for example, in toggle mode.

In an embodiment, control circuit 330 is configured to interpret previously described commands received from the memory controller 318. In an exemplary embodiment, in response to being instructed by host system 200 to write data to memory 316, memory controller 318 may issue a write command via data bus 234. The memory controller 318 may subsequently write the data to XDL 324. The control circuit 330 may interpret the received command as a write command and cause the programming circuit 320 to write the data from XDL 324 to an appropriate memory block and erased memory page of non-volatile memory 308. Similarly, when instructed to read data from a specified memory page, memory controller 318 may issue a read command. The control circuit 330 may interpret the received command as a read command and cause reading circuit 318 to reads data from the specified memory page into the XDL 324 and memory controller 318 transfers the read data from the XDL 324 to controller RAM 304. The exchange of data may be performed using legacy mode or toggle mode or a combination thereof. For example, data may be read using the toggle mode and writing of data may be performed using the legacy mode.

In an exemplary embodiment, memory controller 318 may issue commands to perform voltage selection tuning (e.g., receive path voltage selection tuning when reading data from the memory and/or transmit path voltage selection tuning when writing data to the memory). For example, in response to receiving a transmit path voltage selection command, for example, the control circuit 330 may interpret the received command as a transmit path voltage selection command and enter into a voltage selection mode as described below with reference FIG. 8. As another example, in response to receiving a receive path voltage selection command, for example, the control circuit 330 may interpret the received command as a receive path voltage selection command and enter into a voltage selection mode as described below with reference FIG. 9.

Figure 5:
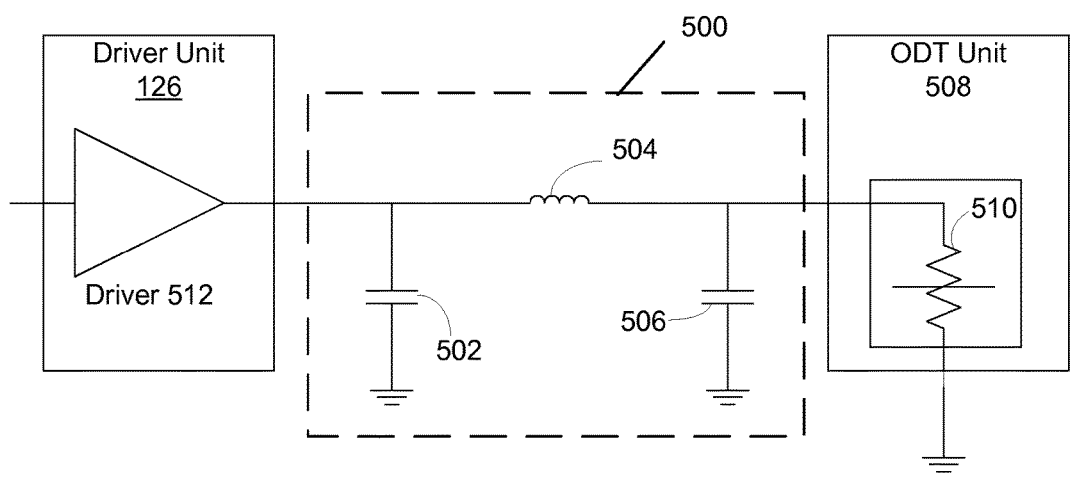
FIG. 5 is a block diagram of a data line and an exemplary on-device termination (ODT) unit.

FIG. 5 illustrates an exemplary data line 500. In an embodiment, data line 500 may correspond to data line D0 of FIG. 1. In this embodiment, data line 300 is connected between primary controller 102 and secondary controller 104. Inductor 504 and capacitors 502 and 506 represent the lumped impedance of the data line 500. The lumped impedance may cause the previously discussed slew rate when the data line signal transitions from one logic state to another. Separately, impedance mismatches between the output of the primary controller 102 and the input of the secondary controller 104 may cause reflections and ringing of the signals on the data lines.

The signals on the respective data lines may settle at their respective desired values at different rates because of differences in the electrical and transmission characteristics of the respective data lines. Additionally, electrical and transmission characteristics associated with a data line may vary with time. The variations may be caused by environmental, electrical and process variations. Adjustment of the electrical and transmission characteristics of a data line may be performed to match the input/output (I/O) impedances presented by the primary controller 102 and secondary controller 104. Matching the electrical and transmission characteristics allows for maximum transmission of electrical energy and prevents reflections on the data line.

In one embodiment, secondary controller 104 may include an on-chip device termination (ODT) 508. In this embodiment, control unit 114 may instruct secondary controller 104 to adjust settings of the ODT 508. ODT 508 may include a variable impedance element 510. The variable impedance element 510 may be adjusted to match the output impedance presented by primary controller 102 and the input impedance presented by secondary controller 104. Variable impedance element 510 may comprise a variable series resistance and a variable parallel resistance. The series resistance may be varied to match the impedance between primary controller 102 and secondary controller 104. The parallel resistance may be varied to reduce the reflections when a signal is communicated on data line 500. The variable impedance element 510 may be adjusted in discrete steps. Thus each step may be associated with corresponding impedance. The difference in the impedance produced when going from a first step to a second step represents the impedance change. The variable impedance element 510 may be characterized by M steps where each step couples an increasing amount of impedance to data line 500. Each step may correspond to a setting of ODT 508.

In an exemplary embodiment, driver unit 126 may include several drivers. A driver may be connected with a respective data line of data bus 106 and DQS 108. Driver 512 is an exemplary driver that may be connected with data line 500. An output of the driver 512 may be connected with data line 500. An input of driver 512 may be connected with componentry of the R/W unit 116 and control unit 114 for example. Any one of the R/W unit 116 or control unit 114 may generate a signal for transmission to secondary controller 104 via data line 500. In an exemplary embodiment, the generated signal may be coupled with the input of driver 512. Driver 512 may couple this signal with the output of driver 512. Driver 512 operates to increase the current sourced at the output of driver 512. The current sourcing capability of driver 512 may be referred to as the current drive. In an exemplary embodiment, the current drive of driver 512 may be controlled by control unit 114. The current drive in conjunction with the lumped impedance of data line 500 determines the shape of the signal when the signal level on data line 500 transitions from one state to another state. The current drive may be incremental adjusted to produce a smooth transition. In an exemplary embodiment, the current drive of driver 512 may be incremented in N steps with each step producing a proportional increase in the current sourced.

Figure 6:
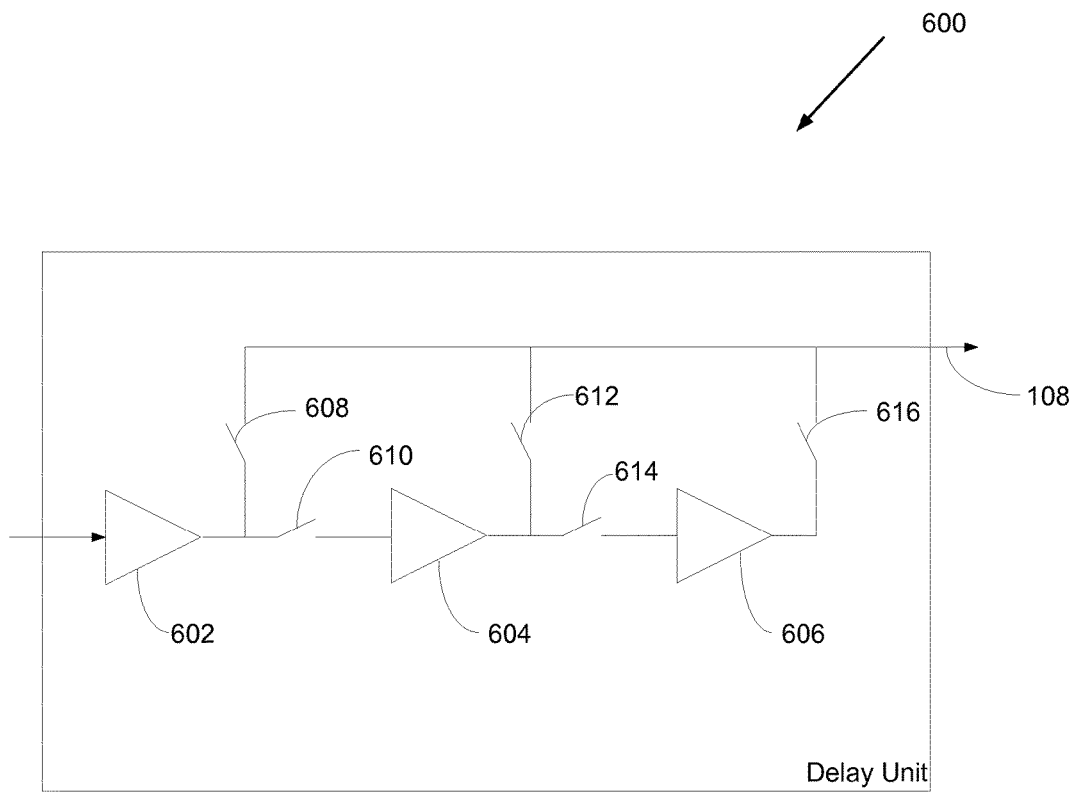
FIG. 6 is a block diagram of an exemplary delay unit that may be implemented in primary controller of FIG. 1.

FIG. 6 is block diagram of an exemplary delay unit 600. Delay unit 600 may correspond to the delay unit 110 of FIG. 1. In this embodiment, control unit 114 may operate delay unit 600 to increase or decrease the delay between writing of data to data lines 106 and activation of the DS signal driven on DQS line 108. In an exemplary embodiment, delay unit 600 may delay transmission of the DQ signal via the DQS line 108.

By way of example and without limitation, in an embodiment, delay unit 600 may comprise three logic buffers 602, 604 and 606. Each logic buffer is provided with an input and an output. Generally, the logic level of the signal at the output or simply the output signal level of a logic buffer tracks or follows the logic level of the signal applied to the input or simply the input signal level of the logic buffer. However, when the input signal level changes, for example from high to low, the change in output signal level of the logic buffer is delayed by a time period. The delay introduced between a change in the input signal level and the corresponding change in the output signal level may be referred to as the propagation delay. The value of this delay is a characteristic of the logic buffer. For example, the value of propagation delay introduced by a TTL logic buffer is 10 nanoseconds. Each logic buffer 602, 604, 606 functions as a delay element. The logic buffers 602, 604, 606 are shown as one example of a type of delay element and other means of delaying the data strobe signal are contemplated in alternative embodiments.

In an embodiment, the propagation delay introduced by logic buffer 602, for example, may be used to delay activation of the DS signal. The duration of delay may be increased by causing the DS signal to be serially communicated through several logic buffers. In an embodiment, switch 610 may be operated by control unit 114 to connect the output of logic buffer 602 to the input of logic buffer 604 causing the DS signal to traverse two logic buffers 602 and 604. Switch 614 may also be operated to connect the output of logic buffer 604 to the input of logic buffer 606 causing the DS signal to additional traverse logic buffer 606 thereby further delaying transmission of the DS signal.

In an embodiment, control unit 114 of FIG. 1 may close switch 608 and open switch 610 to cause DS signal to be delayed by the propagation delay of logic buffer 602. This setting of the switches of the delay unit 600 may be referred to as a delay setting. Control unit 114 may open switches 608 and 614 and close switch 612 to cause DS signal to be delayed by the cumulative propagation delays of logic buffers 602 and 604. This setting of the switches of the delay unit 600 may correspond to another delay setting. Control unit 114 may open switches 608 and 614 and close switches 610 and 612 to cause DS signal to be delayed by the cumulative propagation delays of logic buffers 602 and 604. Control unit 114 may open switches 608 and 612 and close switches 610, 612 and 616 to cause DS signal to be delayed by the cumulative propagation delays of logic buffers 602, 604, and 606. This setting of the switches of the delay unit 600 may correspond to yet another delay setting. Switching in additional logic buffers by appropriately operating the switches has the effect of increasing the delay period 414 (FIG. 4A). Removing logic buffers by appropriately operating the switches has the effect of increasing the delay period 414 (FIG. 4A). The number of logic buffers switched into the signal path may correspond to a setting of delay unit 610. Three logic buffers are simply provided by way of example and other numbers or types of signal delay mechanisms may be implemented in alternative embodiments.

In embodiments described herein, primary controller 102 may select a voltage to supply to the I/O interface and determine one or more data integrity criteria for the I/O interface at the supplied voltage. As discussed above, the I/O interface may transmit data from or receive data from the I/O interface. In this regard, the selection of the voltage and the determination as to the data integrity criteria may be performed for one or both of transmitting data to or receiving data from the I/O interface.

In the example of a storage device, primary controller 102 may select the voltage and determine the data integrity criteria when reading data from the storage device. In this context, primary controller 102 may write data to secondary controller 104 (such as writing the data in the legacy mode of operation) and repeatedly read the written data back (such as in the toggle mode of operation), determining the delay settings at which the read data is equal to the written data.

In one embodiment, the primary controller 102 may determine the delay settings, at the selected voltage, as the data integrity criteria. Thus, after initializing the delay unit 600 with a predetermined delay setting (e.g., ¼ phase delay), the delay unit 600 may be operated to increase the relative delay between activation of the DS signal driven on DQS line 108 and reading of data of the data lines 106. After each increase in the relative delay, data may be read back from the secondary controller 106 in toggle mode and the read data may be compared with the written data. As used herein equal means that the test data written to a location is the same as the test data read out from that location. This may be determined by performing a comparison, arithmetic or bitwise for example, between the written test data and the read data. In response to determining that the read data is not equal to the written data, the delay unit 600 may be operated to decrease the delay the relative delay from the predetermined delay setting between activation of the DS signal driven on DQS line 108 and reading of data of the data lines 106. Again, after each such decrease, data may be read back from the secondary controller 106 in toggle mode and the read data may be compared with the written data until the read data does not equal the written data. In this way, at the selected voltage, the range of delay settings where the read data is equal to the written data may be determined.

In an alternative embodiment, the initialized value of the delay unit 600 is the maximum delay setting. After which, the delay unit 600 may be operated to decrease the delay the relative delay between activation of the DS signal driven on DQS line 108 and reading of data of the data lines 106 in order to find the range of delay settings where the read data is equal to the written data may be determined.

Similarly, in the example of a storage device, primary controller 102 may select the voltage and determine the data integrity criteria when writing data to the storage device. In this context, primary controller 102 may repeatedly write data to secondary controller 104 (such as repeatedly writing the data in the toggle mode of operation) and repeatedly read the written data back (such as in the legacy mode of operation).

In one embodiment, the primary controller 102 may determine the delay settings, at the selected voltage, as the data integrity criteria. Thus, after initializing the delay unit 600 with a predetermined delay setting (e.g., ¼ phase delay or the maximum delay), the delay unit 600 may be operated to step through different values of the relative delay between activation of the DS signal driven on DQS line 108 and reading of data of the data lines 106. After each change in the relative delay (whether decreasing or increasing the relative delay), data may be written to the secondary controller 106 in toggle mode and the data may be read back (such as in legacy mode). After which, the read data may be compared with the written data. In this way, at the selected voltage, the range of delay settings at which the written data equals the ready data may be determined.

Figure 7:
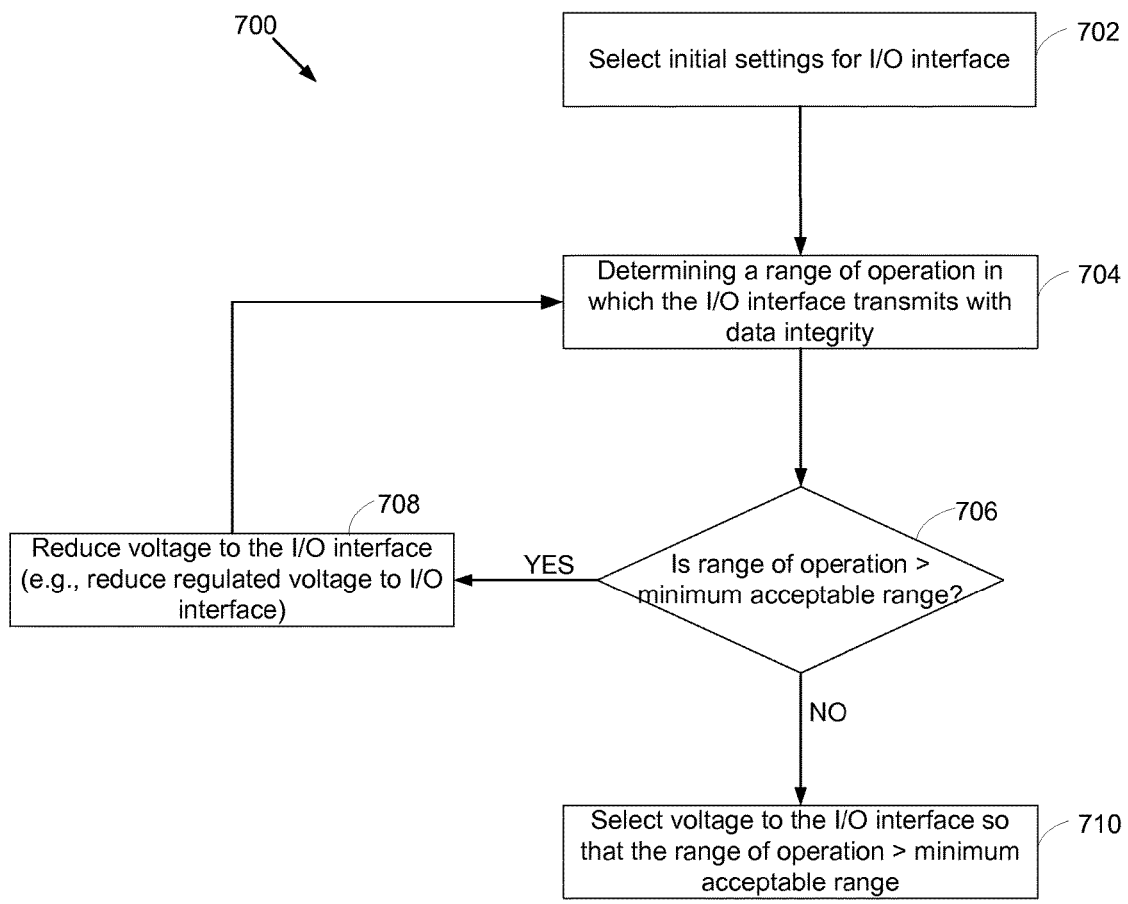
FIG. 7 is flow diagram of an exemplary method that determines a voltage for the I/O interface.

FIG. 7 is flow diagram 700 of an exemplary method that determines a voltage for the I/O interface. At 702, the initial settings for the I/O interface are selected. Initial settings may include, for example, the voltage to one or more pads of the I/O interface and the drive strength. The settings are listed for illustration purposes. Other settings are contemplated. As discussed above, the voltage regulator may output a regulated voltage to the pads of the I/O interface. Likewise, the driver, such as driver unit 126 or driver unit 332, may be configured to drive current to or to source current from the I/O interface.

At the 704, a range of operation may be determined at which the I/O interface transmits with data integrity. As discussed above, different criteria may be examined. One such criteria is the timing of the data transfer via the I/O interface. The timing may be represented in one of several ways, such as the window (or eye) during which data may be reliably transferred (see 456 in FIG. 4B) or as the range of DLL settings. Further, as discussed above, data integrity may comprise whether there was an error in transferring the data through or in receiving the data from the I/O interface.

At 706, the range of operation is compared with the minimum acceptable range to determine whether the range of operation is greater than the minimum acceptable range. In the example of timing, the window or a range of DLL settings may be compared with a minimum acceptable window or range of DLL settings. In particular, the configuration of the electronic device may define a minimum acceptable range, such as a minimum range of DLL settings.

In the event that the range of operation is greater than the minimum acceptable range, at 708, the voltage to the I/O interface is reduced and the flow diagram 700 loops back to 704. After which, the flow diagram 700 may iterate, determining the range of operation of the I/O interface at the reduced voltage, and then comparing whether the range of operation is greater than the minimum acceptable range.

The flow diagram 700 iterates until at 706, it is determined that the range of operation is less than the minimum acceptable range. At 710, the voltage to the I/O interface is selected so that the range of operation > or equal to the minimum range of operation.

Figure 8:
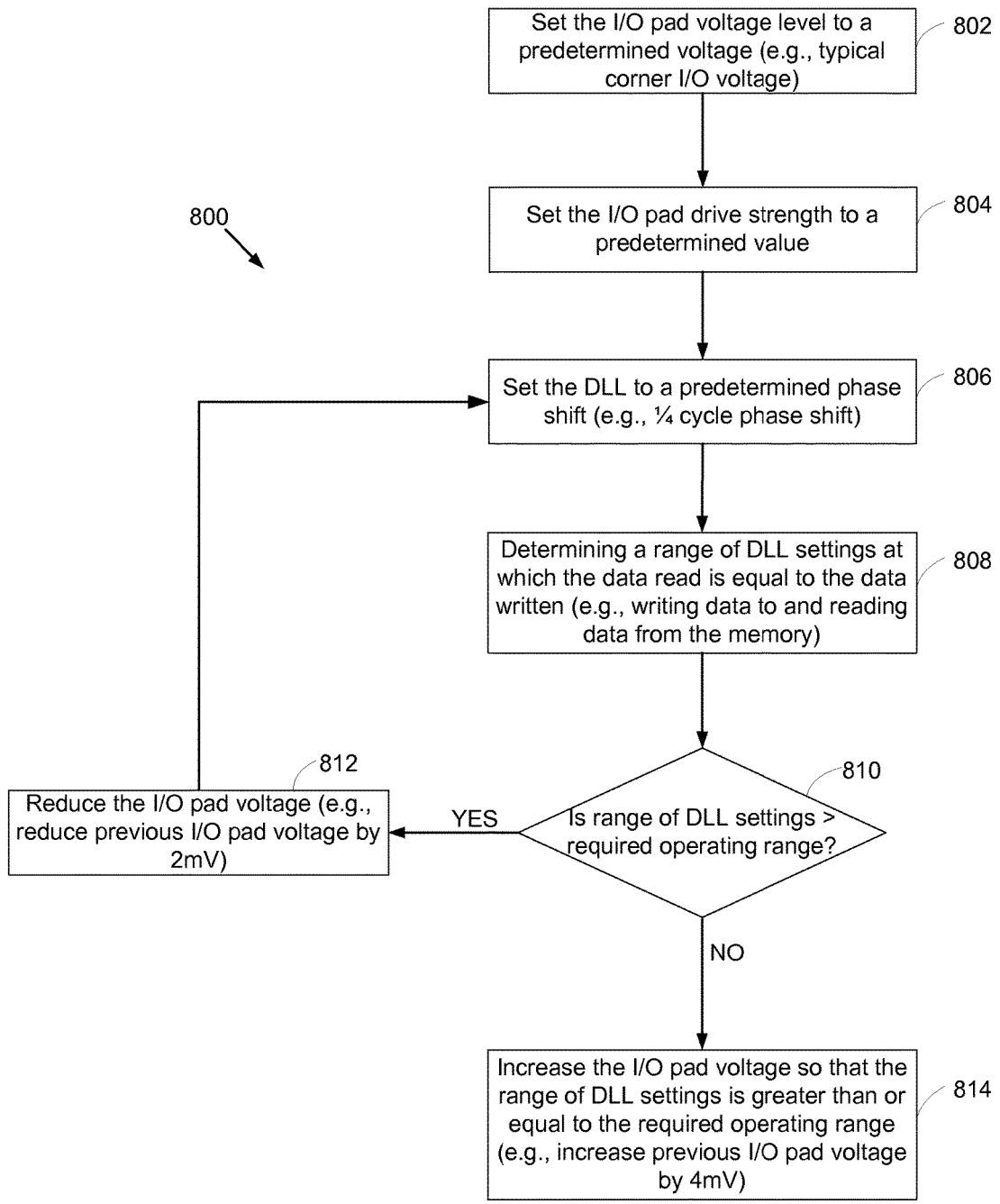
FIG. 8 is flow diagram of an exemplary method that determines a voltage for the I/O interface when performing a toggle mode read.

FIG. 8 is flow diagram 800 of an exemplary method that determines a voltage for the I/O interface when performing a toggle mode read. At 802, the I/O pad voltage level is set to a predetermined voltage. As discussed above, different process corners may comprise fast-fast, slow-slow, and typical-typical. In this regard, the I/O pad voltage level may be selected to comport with one of the process corners, such as typical-typical. At 804, the I/O pad drive strength is likewise set to a predetermined value.

At 806, the DLL may be set to a predetermined phase shift. As discussed above, the predetermined phase shift may comprise a ¼ cycle phase shift or a maximum phase shift. At 808, the range of DLL settings at which the data read is equal to the data written. For example, at a variety of DLL settings, the data may be written in toggle mode and the data may be read (either in legacy mode or in toggle mode). At the different DLL settings, the data written may be compared to the data read to determine whether the data written is equal to the data read. If at a particular DLL setting the data written is equal to the data read, data integrity is determined to occur at the particular DLL setting.

At 810, it is determined whether the range of DLL settings is greater than the required operating range. If so, at 812, the I/O pad voltage is reduced. The reduction in voltage to the I/O pad may be reduced by a predetermined amount, such as by 2 mV. After which, the flow diagram 800 loops back to 806.

The flow diagram 800 iterates until at 810, the range of DLL settings is less than the required operating range. After which, at 814, the I/O pad voltage is increased so that the range of DLL settings is greater than or equal to the minimum operating range. For example, the I/O pad voltage may be increased by 4 mV from the voltage at the last iteration (which resulted in a range of DLL settings being less than the minimum operating range).

As an example, an entire clock cycle may comprise 100 nSec. For illustration purposes, the clock cycle may be divided into 4 equal quarters of 25 nSec. When the clock cycle begins, it is considered to be at 0°, and when the clock cycle ends, it is considered to be at 90°. The middle of the clock cycle (50 nSec) is at 180°, and the first quarter of the clock cycle (25 nSec) is at 90°.

A drive current is selected. Likewise, A voltage may initially be selected for application on the I/O pad(s). The degree delay may be selected. In one embodiment, the initial delay is selected as 90° (25 nSec). After which, the delay, using for example delay unit 110, may be increased from 90°. The data is written to the storage device at the selected delay with the selected applied voltage and the selected drive current. The data is then read from the storage device, and compared to the written data. Until the I/O interface breaks down, whereby the data read does not equal the data written, the delay is increased. After finding the upper limit of the delay, the delay is decreased from 90° until the lower limit is found.

For example, in a first iteration with the applied voltage to the I/O pad(s) equaling 1.1V, the delay setting begins at 25 nSec, and increased. At 40 nSec, the data written (e.g., "XYZ") is compared with the data read (e.g., "ABC"), meaning that the data written does not equal the data read so that the I/O interface has broken down with 40 nSec. being the upper limit. Similar, the delay may be decreased from 25 nSec. At 10 nSec, the data written ("XYZ") does not equal the data read, meaning that the I/O interface has broken down with 10 nSec as the lower limit. In this regard, the I/O interface may transmit data with data integrity between 10 nSec and 40 nSec so that the data integrity window is 30 nSec at the initial applied voltage of 1.1V.

For most applications, a 10 nSec window is sufficient. In this regard, the data integrity window of 30 nSec is compared to the 10 nSec sufficiency window. Since the data integrity window of 30 nSec is greater than the 10 nSec sufficiency window, the applied voltage to the I/O pad(s) is reduced from 1.1V, such as by 2 mV to 1.08V. Thus, 1.08V is applied to the I/O pad(s) and the upper and lower limits of data integrity are determined again. In this instance, since a lower voltage is applied, the window narrows. For example, the upper limit may reduce to 35 nSec and the lower limit may increase to 15 nSec, making the window 20 nSec. Again, the 20 nSec window is compared to the 10 nSec window and determined to be larger. The applied voltage to the I/O pad(s) are reduced again by 2 mV to 1.06V and the process is repeated yet again. In this iteration, the upper limit may be reduced to 30 nSec and the lower limit may increase to 20 n Sec, resulting in a window of 10 nSec. Yet again, the 10 nSec window is compared to the 10 nSec window and determined to be the same. In response to determining that the window equals the minimum sufficiency window, the sequence is not iterated again and the applied voltage of 1.06 V is used as the applied voltage.

Figure 9:
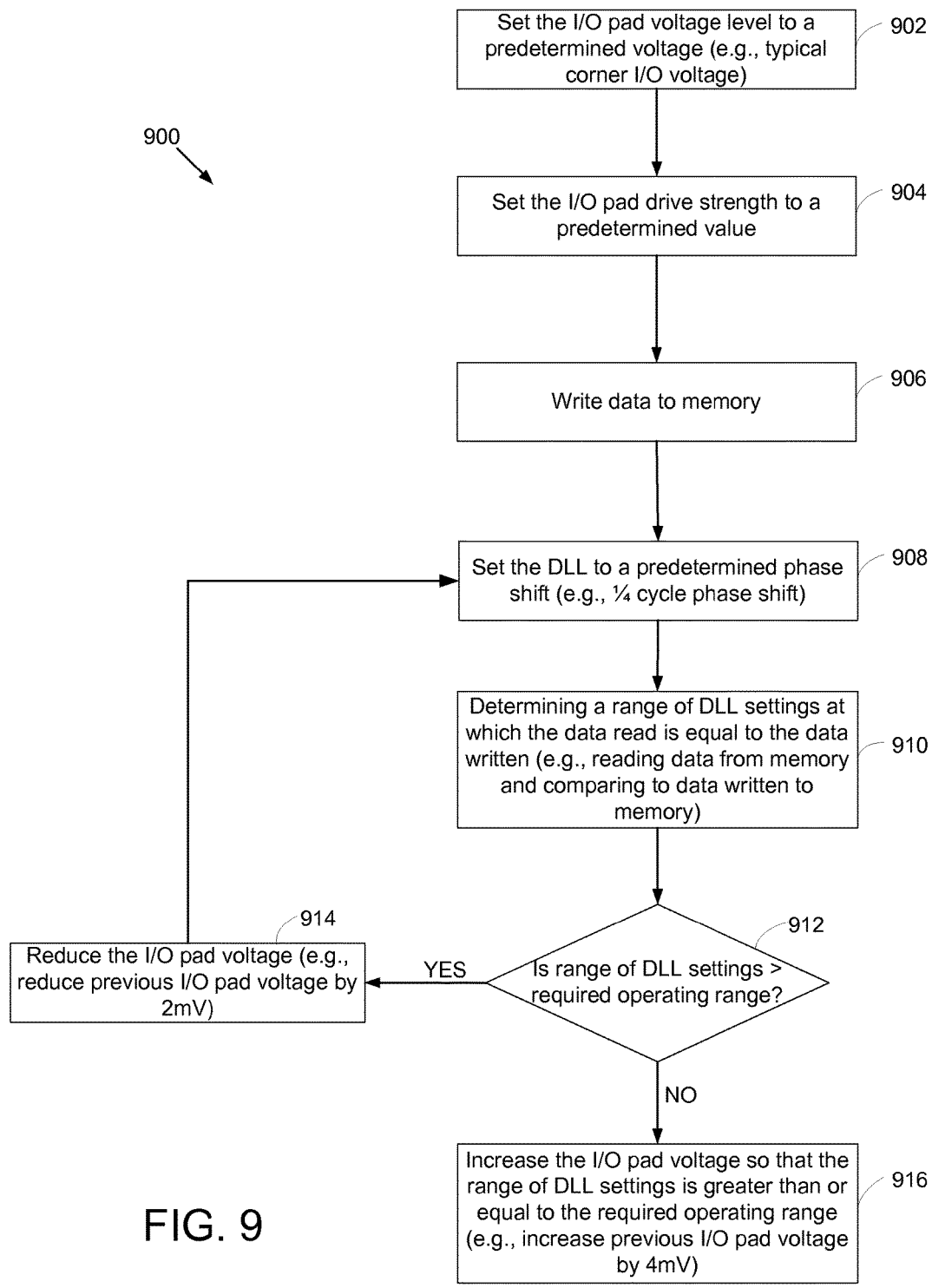
FIG. 9 is flow diagram of an exemplary method that determines a voltage for the I/O interface when performing a toggle mode write.

FIG. 9 is flow diagram 900 of an exemplary method that determines a voltage for the I/O interface when performing a toggle mode write. At 902, the I/O pad voltage is set to a predetermined voltage, such as a voltage assuming a typical process corner. At 904, the I/O pad drive strength is likewise set to a predetermined value.

At 906, data is written to the memory, such as written using legacy mode. At 908, the DLL may be set to a predetermined phase shift (e.g., a ¼ cycle phase shift or a maximum phase shift). At 910, a range of DLL settings is determined at which the data read is equal to the data written at 906. For example, at a variety of DLL settings, the data may be read in toggle mode, with the read data compared to the data written at 906. If at a particular DLL setting the data read is equal to the data written, data integrity is determined to occur at the particular DLL setting.

At 912, it is determined whether the range of DLL settings is greater than the required operating range. If so, at 914, the I/O pad voltage is reduced. The reduction in voltage to the I/O pad may be reduced by a predetermined amount, such as by 2 mV. After which, the flow diagram 900 loops back to 908.

The flow diagram 900 iterates until at 912, the range of DLL settings is less than the required operating range. After which, at 816, the I/O pad voltage is increased so that the range of DLL settings is greater than or equal to the minimum operating range. For example, the I/O pad voltage may be increased by 4 mV from the voltage at the last iteration (which resulted in a range of DLL settings being less than the minimum operating range).

As discussed above, one type of electronic device that may include an I/O interface is a storage device. The storage device may comprise a semiconductor memory device, including volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magneto-resistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional exemplary structures described but cover all relevant memory structures within the spirit and scope of the invention as described herein and as understood by one of skill in the art.

A "computer-readable medium," "machine readable medium," "propagated-signal" medium, and/or "signal-bearing medium" may comprise any device that includes, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM", a Read-Only Memory "ROM", an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

I claim:

1. An I/O interface configuration device comprising:
   a voltage component configured to output a voltage to at least a part of an I/O interface; and
   an iterative component configured to iterate at a plurality of different voltages by:
      commanding the voltage component to output each of the plurality of different voltages to the at least a part of the I/O interface;
      determining a range of delay locked loop settings at which data is correctly transferred via the I/O interface using each of the plurality of different voltages; and
   an I/O interface selection component configured to select, based on the range of delay locked loop settings at which the data is correctly transferred, the voltage applied to the at least a part of the I/O interface.

2. The I/O interface configuration device of claim 1, wherein the voltage component comprises a voltage regulator.

3. The I/O interface configuration device of claim 1, wherein the iterative component is configured to command the voltage component to output a first voltage to a pad of the I/O interface and to determine the range of delay locked loop settings at which the data transferred via the I/O interface using the first voltage; and
   wherein the iterative component is further configured to determine whether to iterate using a different voltage based on the range of the delay locked loop settings at which the data transferred via the I/O interface using the first voltage.

4. The I/O interface configuration device of claim 3, wherein the iterative component is configured to determine whether to iterate using the different voltage than the first voltage based on the comparing the range of the delay locked loop settings at which the data transferred via the I/O interface using the first voltage with a predetermined range.

5. The I/O interface configuration device of claim 4, wherein the predetermined range comprises a minimum range;
   wherein the iterative component is configured to iterate using the different voltage in response to determining that the range of the condition under which the data transferred via the I/O interface using the first voltage is greater than the minimum range; and
   wherein the different voltage is a lower voltage than the first voltage.

6. The I/O interface configuration device of claim 5, wherein the I/O configuration device is included in a first electronic device;
   wherein the data transferred via the I/O interface comprises data transmitted from the first electronic device to a second electronic device using the selected voltage; and
   wherein the range of delay locked loop settings at which the data transmitted from the first electronic device using the selected voltage is equal to the data received by the first electronic device.

7. An I/O interface configuration device comprising:
   a voltage selection component configured to select a voltage applied to at least a part of an I/O interface;
   a data integrity component configured to determine data integrity of data transferred via the I/O interface using the selected voltage;
   an evaluation component configured to evaluate, based on the determined data integrity of data transferred via the I/O interface using the selected voltage, whether timing at which data is correctly transferred via the I/O interface, using the selected voltage, is greater than a minimum; and
   an I/O interface selection component configured to select, based on the evaluation component, the voltage applied to the at least a part of the I/O interface.

8. The I/O interface configuration device of claim 7, wherein the voltage selection component comprises a voltage regulator configured to output the selected voltage.

9. The I/O interface configuration device of claim 7, wherein the I/O configuration device is included in a first electronic device;
   wherein the data transferred via the I/O interface comprises data transmitted from the first electronic device to a second electronic device using the selected voltage;
   wherein the data integrity component is configured to determine the range of timing at which data is reliably transferred via the I/O interface by determining a range of delay locked loop settings at which the data transmitted from the first electronic device using the selected voltage is equal to the data received by the first electronic device.

10. The I/O interface configuration device of claim 7, wherein the I/O configuration device is included in a first electronic device;
   wherein the data transferred via the I/O interface comprises data received by the first electronic device from a second electronic device;
   wherein the data integrity component is configured to determine the range of timing at which data is reliably transferred via the I/O interface by determining a range of delay locked loop settings at which the data received by the first electronic device from the second electronic device using the selected voltage is equal to the data transmitted by the first electronic device.

11. The I/O interface configuration device of claim 7, wherein the evaluation component is further configured to:
  in response to determining that the range at which the data is transferred with data integrity is greater than the minimum range:
    instruct the voltage selection component to reduce the voltage applied to the at least a part of the interface;
    instruct the data integrity component to determine the data integrity of data transferred via the I/O interface using the reduced voltage; and
    determine whether the range at which the data is transferred with data integrity is greater than the minimum range.

12. The I/O interface configuration device of claim 11, wherein the evaluation component is further configured to iterate the following until the range at which the data is transferred with data integrity is less than the minimum range:
  instruct the voltage selection component to reduce voltage applied to the at least a part of the interface in a previous iteration;
  instruct the data integrity component to determine the data integrity of data transferred via the I/O interface using the reduced voltage.

13. The I/O interface configuration device of claim 7, wherein the voltage is applied to one or more pads of the I/O interface; and further comprising a drive current selection component configured to select the drive current supplied to or sourced from the I/O interface.

14. A method for determining a voltage at which to operate a part of an I/O interface, the method comprising:
  selecting a voltage at which to operate the part of I/O interface;
  determining a range of timing at which data is correctly transferred via the I/O interface using the selected voltage;
  determining whether the range of timing at which the data is correctly transferred via the I/O interface using the selected voltage is greater than a minimum range; and
  in response to determining that the range of timing is greater than the minimum range, select a different voltage at which to operate the part of I/O interface.

15. The method of claim 14, wherein the selected voltage is applied to a pad of the I/O interface.

16. The method of claim 14, further comprising:
  in response to determining to select a different voltage at which to operate the part of I/O interface, determining a range of timing at which data is correctly transferred via the I/O interface using the different voltage.

17. The method of claim 16, wherein the different voltage is less than the selected voltage.

18. The method of claim 17, wherein the range of timing comprises a range of delay locked loop settings.

19. The method of claim 17, wherein the range of timing comprises a window in which data is correctly transferred via the I/O interface.

* * * * *